United States Patent
Xu et al.

(10) Patent No.: US 11,854,402 B2
(45) Date of Patent: Dec. 26, 2023

(54) METHOD, APPARATUS, AND SYSTEM FOR DETECTING LANE DEPARTURE EVENTS BASED ON PROBE DATA AND SENSOR DATA

(71) Applicant: HERE Global B.V., Eindhoven (NL)

(72) Inventors: Jingwei Xu, Chicago, IL (US); Yuxin Guan, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 153 days.

(21) Appl. No.: 17/371,897

(22) Filed: Jul. 9, 2021

(65) Prior Publication Data
US 2022/0013014 A1    Jan. 13, 2022

Related U.S. Application Data

(60) Provisional application No. 63/050,508, filed on Jul. 10, 2020.

(51) Int. Cl.
*G08G 1/16* (2006.01)
*H04W 4/38* (2018.01)
(Continued)

(52) U.S. Cl.
CPC ........... *G08G 1/167* (2013.01); *G06F 16/285* (2019.01); *G06F 16/29* (2019.01); *H04W 4/38* (2018.02); *H04W 4/40* (2018.02)

(58) Field of Classification Search
CPC .......... G08G 1/167; H04W 4/38; H07W 4/40; G06F 16/285; G06F 16/29
(Continued)

(56) References Cited

U.S. PATENT DOCUMENTS

| 7,409,279 B2 | 8/2008 | Sugano et al. |
| 7,477,988 B2 | 1/2009 | Dorum |

(Continued)

FOREIGN PATENT DOCUMENTS

DE    102011121440 A1    6/2013

OTHER PUBLICATIONS

"Strategic Transit Automation Research Plan" Jul. 2018, FTA Report No. 0116, Federal Transit Administration, retrieved on Jul. 10, 2020 from https://www.transit.dot.gov/sites/fta.dot.gov/files/docs/research-innovation/114661/strategic-transit-automation-research-report-no-0116_0.pdf, 262 Pages.

*Primary Examiner* — Kerri L McNally
*Assistant Examiner* — Thang D Tran
(74) *Attorney, Agent, or Firm* — DITTHAVONG, STEINER & MLOTKOWSKI

(57) ABSTRACT

An approach is provided for detecting lane departure events based on map data and probe data. The approach, for example, involves map-matching probe data to a lane of a road segment. The probe data is collected from one or more sensors of at least one vehicle and/or at least one user device that traversed the road segment. The approach also involves processing the probe data to detect at least one lane departure event. The approach further involves categorizing the at least one lane departure event as an intentional lane departure event or an unintentional lane departure event. The approach further involves creating a lane departure warning message for the road segment based on the at least one categorized lane departure event, and/or road segments associated with multiple lane departure warning messages within a certain time period. The approach further involves providing the lane departure warning message as an output.

19 Claims, 14 Drawing Sheets

(51) Int. Cl.
  *G06F 16/28* (2019.01)
  *G06F 16/29* (2019.01)
  *H04W 4/40* (2018.01)

(58) Field of Classification Search
  USPC ........................................................ 340/438
  See application file for complete search history.

(56) References Cited

U.S. PATENT DOCUMENTS

| | | | |
|---|---|---|---|
| 9,073,405 B2 | 7/2015 | Choi et al. | |
| 10,272,838 B1* | 4/2019 | Pertsel | H04N 7/188 |
| 10,365,649 B2 | 7/2019 | Zhu et al. | |
| 10,832,571 B2* | 11/2020 | Yamada | G08G 1/0145 |
| 10,904,276 B2* | 1/2021 | Phadke | H04L 63/1425 |
| 2002/0198632 A1* | 12/2002 | Breed | G01S 17/86 |
| | | | 701/472 |
| 2006/0279233 A1* | 12/2006 | Kim | B60Q 11/007 |
| | | | 315/291 |
| 2007/0016369 A1* | 1/2007 | Ishikawa | G01C 21/00 |
| | | | 701/408 |
| 2007/0069874 A1* | 3/2007 | Huang | B62D 15/029 |
| | | | 340/435 |
| 2008/0046150 A1* | 2/2008 | Breed | B60R 21/0134 |
| | | | 701/45 |
| 2009/0237230 A1* | 9/2009 | Ponziani | B60Q 1/346 |
| | | | 340/457 |
| 2010/0191421 A1* | 7/2010 | Nilsson | B62D 15/025 |
| | | | 701/41 |
| 2012/0203399 A1* | 8/2012 | Filev | B60W 30/02 |
| | | | 701/1 |
| 2012/0206252 A1* | 8/2012 | Sherony | B60W 30/12 |
| | | | 340/438 |
| 2013/0335213 A1* | 12/2013 | Sherony | B60W 30/12 |
| | | | 340/439 |
| 2014/0022070 A1* | 1/2014 | Golomb | B60Q 1/0082 |
| | | | 340/475 |
| 2014/0265479 A1* | 9/2014 | Bennett | B60N 2/919 |
| | | | 297/217.4 |
| 2014/0280177 A1* | 9/2014 | Ishii | G06F 16/285 |
| | | | 707/740 |
| 2015/0170514 A1* | 6/2015 | Stenneth | G08G 1/0125 |
| | | | 701/117 |
| 2015/0235140 A1* | 8/2015 | Rothermel | G06N 5/048 |
| | | | 706/52 |
| 2016/0129920 A1* | 5/2016 | Hall | B60N 2/665 |
| | | | 701/1 |
| 2016/0265924 A1* | 9/2016 | Neyama | G01C 21/28 |
| 2016/0358349 A1* | 12/2016 | Dorum | G06T 11/203 |
| 2017/0089717 A1* | 3/2017 | White | G08G 1/0112 |
| 2017/0225618 A1* | 8/2017 | Tanaka | B60N 2/0276 |
| 2017/0305434 A1* | 10/2017 | Ratnasingam | B60W 50/14 |
| 2018/0182238 A1* | 6/2018 | Fowe | G08G 1/0112 |
| 2018/0218611 A1* | 8/2018 | Nagura | B60Q 9/00 |
| 2018/0357890 A1* | 12/2018 | Fowe | G08G 1/0133 |
| 2018/0362083 A1* | 12/2018 | Su | G06V 20/588 |
| 2019/0025837 A1* | 1/2019 | Conor | G05D 1/0278 |
| 2019/0025853 A1* | 1/2019 | Julian | G06V 10/82 |
| 2019/0071091 A1 | 3/2019 | Zhu et al. | |
| 2019/0080611 A1* | 3/2019 | Yamada | G08G 1/166 |
| 2019/0102689 A1* | 4/2019 | Lassoued | G07C 5/085 |
| 2019/0171988 A1* | 6/2019 | Kwatra | G06Q 10/06314 |
| 2019/0186948 A1 | 6/2019 | Haydee et al. | |
| 2019/0340537 A1* | 11/2019 | Fung | G06N 20/00 |
| 2020/0047746 A1* | 2/2020 | Ji | B60W 50/14 |
| 2020/0126406 A1* | 4/2020 | Ma | G08G 1/096716 |
| 2020/0210725 A1* | 7/2020 | Suzuki | G06V 20/58 |
| 2020/0239071 A1* | 7/2020 | Lenneman | B62D 15/029 |
| 2020/0298858 A1* | 9/2020 | Stenneth | G08G 1/167 |
| 2020/0307600 A1* | 10/2020 | Sato | B60W 60/0015 |
| 2020/0361452 A1* | 11/2020 | McGill | B60W 50/045 |
| 2021/0082279 A1* | 3/2021 | Fang | G06N 5/045 |
| 2021/0291861 A1* | 9/2021 | Jiao | G06V 20/56 |
| 2021/0295067 A1* | 9/2021 | Jiao | G06V 20/582 |
| 2021/0370986 A1* | 12/2021 | Heyl | G06F 18/25 |
| 2022/0009492 A1* | 1/2022 | Adwan | B60W 40/105 |
| 2022/0032994 A1* | 2/2022 | Fusconi | B62D 6/10 |

\* cited by examiner

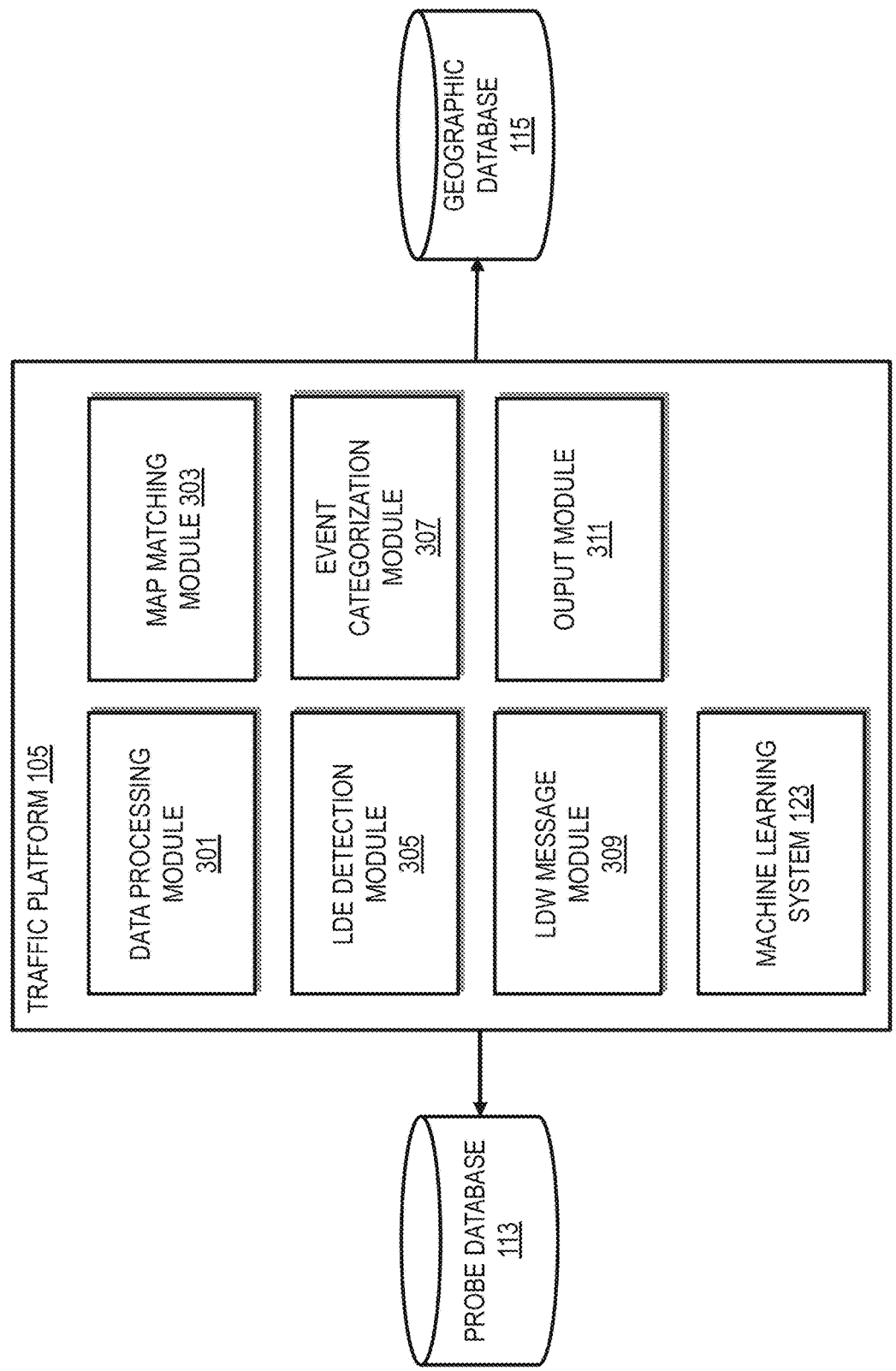

METHOD, APPARATUS, AND SYSTEM FOR DETECTING LANE DEPARTURE EVENTS BASED ON PROBE DATA AND SENSOR DATA

RELATED APPLICATION

This application claims priority to U.S. Provisional Patent Application Ser. No. 63/050,508, filed Jul. 10, 2020, entitled "METHOD, APPARATUS, AND SYSTEM FOR DETECTING LANE DEPARTURE EVENTS BASED ON PROBE DATA AND SENSOR DATA", which is incorporated herein by reference in its entirety.

BACKGROUND

Navigation and mapping service providers are continually challenged to provide users up-to-date data on traffic flow and lane departure crashes. However, service providers often only report real-time static incidents on a specific road segment, which can quickly become out of date in terms of time and/or location relative to dynamic traffic events. To improve the safety of highly automated driving or autonomous driving, the navigation and mapping service providers see a potential of incorporating lane departure warnings (LDWs) in traffic data to reduce lane departure crashes and improve safety. The existing lane keeping systems offered by vehicle manufacturers usually use vehicle cameras to monitor road lane markings and detect unintentional drifting toward lane edges, then alert a driver to stay in the lane. Such systems merely serve one vehicle with a LDW, without taking advantage of sharing data via the interconnected transport infrastructure that supports autonomous driving. Accordingly, mapping service providers face significant technical challenges to use available data to detect lane departure events (LDEs) for one or more vehicles and to enhance traffic information reporting using LDEs.

SOME EXAMPLE EMBODIMENTS

Therefore, there is a need for detecting lane departure events (LDEs) based on map data and probe data, and for providing proactive lane departure warning (LDW) messages to vehicles, including upstream vehicles.

According to one embodiment, a method comprises map-matching probe data to a lane of a road segment. The probe data is collected from one or more sensors of at least one vehicle that traversed the road segment, of one or more user devices within the at least one vehicle, or a combination thereof. The method also comprises processing the probe data to detect at least one lane departure event. The method further comprises categorizing the at least one lane departure event as an intentional lane departure event or an unintentional lane departure event. The method further comprises creating a lane departure warning message for the road segment based on the at least one categorized lane departure event. The method further comprises providing the lane departure warning message as an output.

According to another embodiment, an apparatus comprises at least one processor, and at least one memory including computer program code for one or more computer programs, the at least one memory and the computer program code configured to, with the at least one processor, cause, at least in part, the apparatus to map-match probe data to a lane of a road segment. The probe data is collected from one or more sensors of at least one vehicle that traversed the road segment, of one or more user devices within the at least one vehicle, or a combination thereof. The apparatus is also caused to process the probe data to detect at least one lane departure event. The apparatus is further caused to categorize the at least one lane departure event as an intentional lane departure event or an unintentional lane departure event. The apparatus is further caused to create a lane departure warning message for the road segment based on the at least one categorized lane departure event. The apparatus is further caused to provide the lane departure warning message as an output.

According to another embodiment, a computer-readable storage medium carries one or more sequences of one or more instructions which, when executed by one or more processors, cause, at least in part, an apparatus to map-match probe data to a lane of a road segment. The probe data is collected from one or more sensors of at least one vehicle that traversed the road segment, of one or more user devices within the at least one vehicle, or a combination thereof. The apparatus is also caused to process the probe data to detect at least one lane departure event. The apparatus is further caused to categorize the at least one lane departure event as an intentional lane departure event or an unintentional lane departure event. The apparatus is further caused to create a lane departure warning message for the road segment based on the at least one categorized lane departure event. The apparatus is further caused to provide the lane departure warning message as an output.

According to another embodiment, an apparatus comprises means for map-matching probe data to a lane of a road segment. The probe data is collected from one or more sensors of at least one vehicle that traversed the road segment, of one or more user devices within the at least one vehicle, or a combination thereof. The apparatus also comprises means for processing the probe data to detect at least one lane departure event. The apparatus further comprises means for categorizing the at least one lane departure event as an intentional lane departure event or an unintentional lane departure event. The apparatus further comprises means for creating a lane departure warning message for the road segment based on the at least one categorized lane departure event. The apparatus further comprises means for providing the lane departure warning message as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a diagram of components of a traffic platform capable of detecting lane departure events based on map data and probe data, according to one embodiment;

DESCRIPTION OF SOME EMBODIMENTS

Examples of a method, apparatus, and computer program for detecting lane departure events based on map data and probe data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
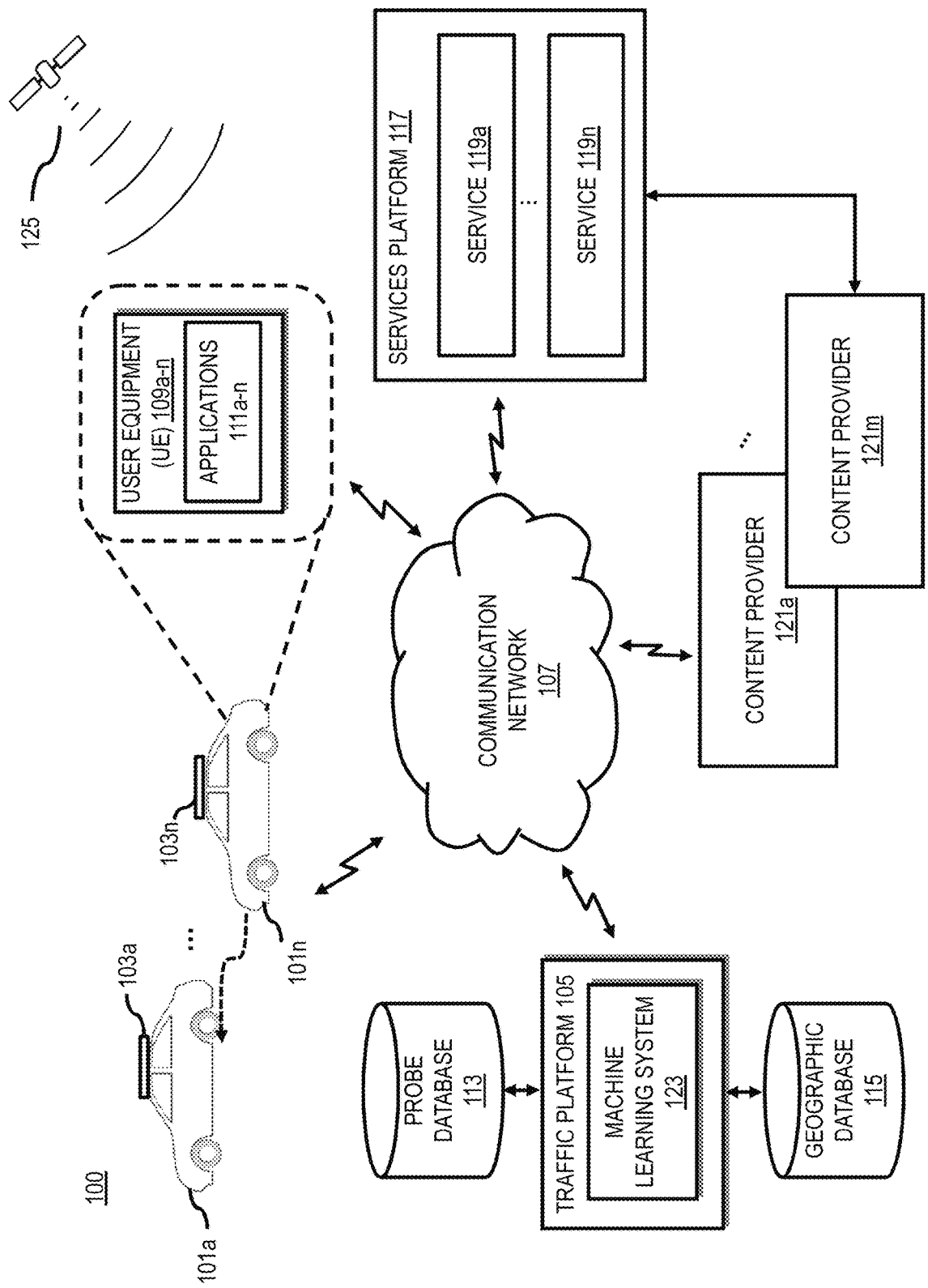
FIG. 1 is a diagram of a system capable of detecting lane departure events (LDEs) based on map data and probe data, according to one embodiment.

FIG. 1 is a diagram of a system capable of detecting lane departure events (LDEs) based on map data and probe data, according to one embodiment. Automated driving has been a hot trend in recent years and is quickly becoming a reality following advances in machine learning, computer vision, and compute power. Generally, an autonomous vehicle is a vehicle driving on the road without human intervention. The term "autonomous vehicle" is often used interchangeably with driverless car and/or robot car. An autonomous vehicle uses different sensor technologies (e.g., a camera sensor, Light Detection and Ranging (LiDAR), etc.) and a high-definition (HD) map or dynamic backend content including traffic information services to travel on a road network with little or no human intervention.

The Federal Highway Administration (FHWA 2009) estimated that 58 percent of roadway fatalities involved lane departures, while 40 percent of fatalities involved single-vehicle (SV) run-off-road crashes. Providing users of autonomous or semi-autonomous vehicles (e.g., drivers or passengers) with up-to-date data on traffic flow and lane departure warnings (LDWs) can reduce lane departure crashes and improve safety on the road network. In addition, statistical lane departure analysis based on historical data will also benefit driving safety. Safe autonomous operations will be significantly improved if LDWs can be determined and shared through an interconnected transport infrastructure that support autonomous driving. For example, it is critical to be aware of the LDW events in under 10 minutes, and ideally even faster so that navigation systems can generate safe lane-level routing and/or re-routing for neighboring vehicles and/or further upstream vehicles.

However, the existing lane keeping systems offered by vehicle manufacturers only use vehicle cameras to monitor road lane markings and detect unintentional drifting toward lane edges, then alert and/or aid a driver to stay in the lane. Such systems merely serve one vehicle with a LDW, or automatically take steps to ensure the vehicle stays in its lane (lane keeping assist), or keep the vehicle centered in the lane and asking the driver to take over in challenging situations (lane centering assist). In such cases, other users of a traffic information service can suffer from unexpected lane departure events, reroutes due to lane departure crashes, etc. As a result, traffic service providers may want to incorporate LDW information in the traffic information service. Accordingly, traffic service providers face significant technical challenges to detect and incorporate LDW information in the traffic information service.

To address these problems, the system 100 of FIG. 1 introduces a capability to detect lane departure events based on map data and probe data and to generate relevant lane departure warning messages to warn current user(s) and/or upstreaming users (e.g., of autonomous vehicles, highly assisted driving (HAD) vehicles, or semi-autonomous vehicles) of a potential lane departure crash via, e.g., multiple traffic message channels (TMCs), vehicle-to-vehicle (V2V) communication services, vehicle-to-everything (V2X) communication services, etc.

The Society of Automotive Engineers International defines driving automation are six levels: Level 0 (automated system has no sustained vehicle control), Level 1 ("hands on"), Level 2 ("hands off"), Level 3 ("eyes off"), Level 4 ("mind off"), and Level 5 ("steering wheel optional"). The system 100 can improve dynamic traffic content delivery on HAD in an open location platform pipeline (OLP) for Level 3 or above autonomous driving. The system 100 can improve driver and/or vehicle awareness of the lane departure events (LDEs) of the road network via the traffic status data of lane departure warning (LEW) messages for all levels 0-5 in a vehicle-to-everything (V2X) communication scheme and big data environment, etc.

Safe autonomous operations generally require the map data to provide at least a lane-level granularity (e.g., so that navigation systems can avoid lane departure crashes). In one embodiment, the system 100 collects a plurality of instances of probe data and/or vehicle sensor data from one or more vehicles 101a-101n (also collectively referred to as vehicles 101) (e.g., autonomous vehicles, HAD vehicles, semi-autonomous vehicles, etc.) having one or more vehicle sensors 103a-103n (also collectively referred to as vehicle sensors 103) (e.g., LiDAR, global positioning system (GPS), camera sensor, etc.) and having connectivity to the traffic platform 105 via the communication network 107. In one instance, probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one instance, the system 100 can also collect the real-time probe data and/or sensor data from one or more user equipment (UE) 109a-109n (also collectively referenced to herein as UEs 109) associated with the a vehicle 101 (e.g., an embedded navigation system), a user or a passenger of a vehicle 101 (e.g., a mobile device, a smartphone, etc.), or a combination thereof. In one instance, the UEs 109 may include one or more applications 111a-111n (also collectively referred to herein as applications 111) (e.g., a navigation or mapping application). In one instance, the system 100 may also collect the probe data and/or sensor data from one or more other sources such as government/municipality agencies, local or community agencies (e.g., a police department), and/or third-party official/semi-official sources (e.g., a services platform 117, one or more services 119a-119n, one or more content providers 121a-121m, etc.). In one embodiment, the probe data and/or sensor data collected by the vehicle sensors 103, the UEs 109, one or more other sources, or a combination thereof may be stored in the probe database 113, the geographic database 115, or a combination thereof.

Autonomous driving safety requires a vehicle to respond to unplanned lane departure events to avoid a crash or fatality accident. It would be difficult to reply only on the onboard senor data of one vehicle to react to the driving environment sudden changes of neighboring vehicles and/or downstream vehicles. It will be much more effective to detect LDEs and handle LDWs by leveraging knowledge of map data, traffic flow, and LDE/LDW data shared via the interconnected transport infrastructure that supports autonomous driving.

In one embodiment, the system 100 can detect a lane departure event (LDE), i.e., whether a vehicle 101 moving out of a lane, by analyzing vehicle probe data along with map data. The vehicle probe data may include timestamp data, geolocation data, speed data, . . . etc. A LDE may occur intentionally or unintentionally when a vehicle moves out of its lane on freeways and arterial roads. In another embodiment, the system 100 can determine a time change, a speed change, a steering angle change, a lane change, etc. of a vehicle 101a based on the probe data, thereby categorizing a lane departure event as intentionally or unintentionally.

Figure 2A:
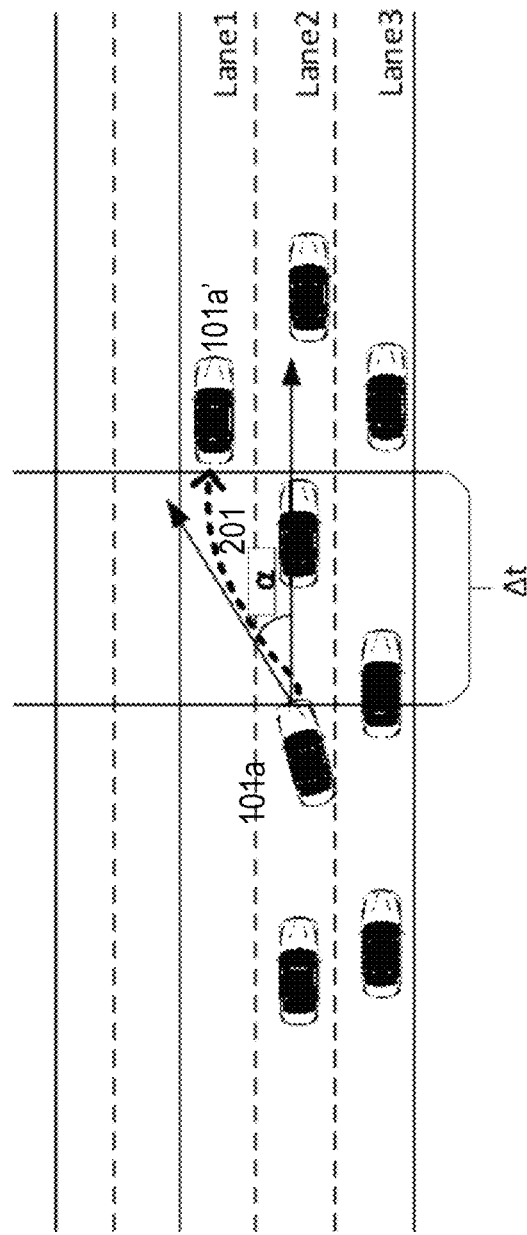
FIGS. 2A-2B are diagrams of example lane departure events, according to one embodiment.

By way of example, FIG. 2A is a diagram of an example intentional lane departure events, according to one embodiment. A LDE may occur intentionally, for example, when a turn signal is turned on at that turn direction. A lane departure event can be defined as a vehicle 101a moved along a vehicle path 201 (e.g., an arrow in a broken line) crossing over the left or right lanes form a lane (e.g., Lane 2) in a time delta $\Delta t$ to a next lane (e.g., Lane 1) as vehicle 101a'. As shown in in FIG. 2A, a lane normal switching or overtaking event by the vehicle 101a may be a three-step procedure: perception, decision, and vehicle control. So, the vehicle path 201 may cross the lane smoothly at a departure angle $\alpha$ and the vehicle speed did not change dramatically.

Figure 2B:
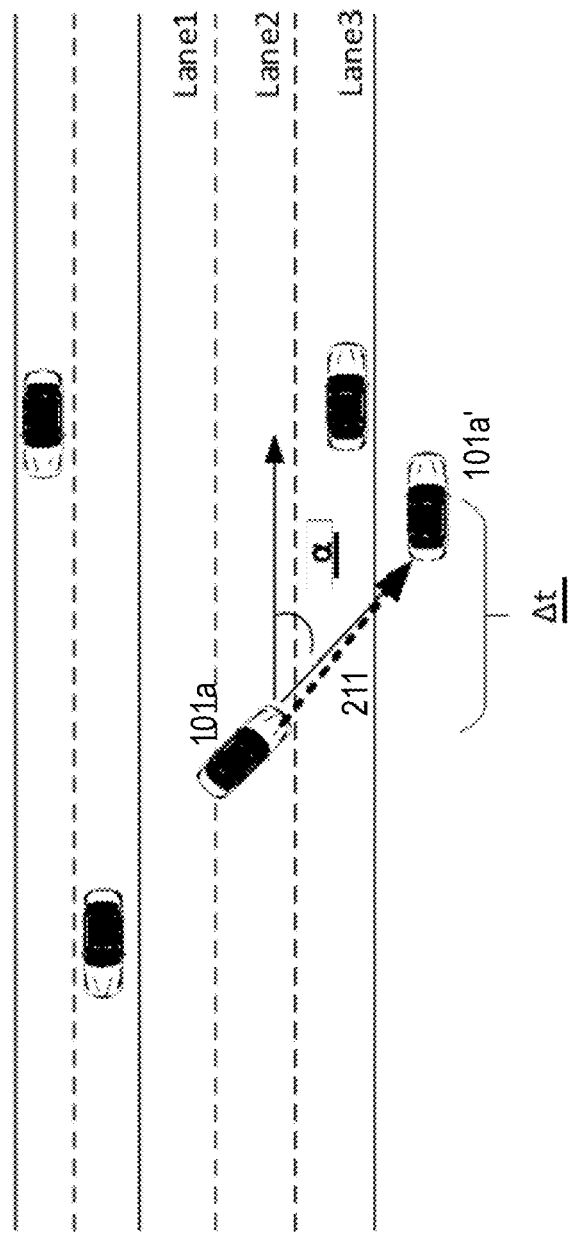

FIG. 2B is a diagram of an example unintentional lane departure events, according to one embodiment. A LDE may occur unintentionally due to driver errors, distractions and/or drowsiness. As shown in FIG. 2B, the vehicle 101a has a sharp lane departure movement along a path 211: out of the driving lane (e.g., Lane 2), across the next lane (e.g., Lane 3), and stopped on the shoulder as vehicle 101a'. In this scenario, the response time delta $\Delta t$ is much shorter than the time delta $\Delta t$ in FIG. 2A, and the vehicle speed changes sharply (which may from a free-flow speed to a below-heavy-congestion speed, or even zero). In addition, this departure angle $\alpha$ is bigger than the departure angle $\alpha$ in FIG. 2A. In another embodiment, the system 100 can use the vehicle sensor data to validate the LDE, to improve LDE data quality, and/or for training LDE/LDW machine learning models as discussed later.

In one embodiment, upon determining LDE data, the system 100 can create a lane departure warning message (LDW) for the road segment and transmit the LDW to the vehicle 101a to, for example, support self-driving.

In another embodiment, upon determining LDE data, the system 100 can identify road segments with multiple lane departure warning messages within a time period by conducting a historical statistical analysis on the LDE data, thereby creating a lane departure warning message (LDW) for the road segment and delivering the LDW to a field vehicle driving upstreaming of the vehicle 101a for cautious driving before reaching the road segment, in order to mitigate driving safety risks of, for example, multiple lane departure events happened in a period time on the road segment.

FIG. 3 is a diagram of the components of the traffic platform 105, according to one embodiment. By way of example, the traffic platform 105 includes one or more components for providing hybrid traffic incident identification, according to the various embodiments described herein. It is contemplated that the functions of these components may be combined or performed by other components of equivalent functionality. In one embodiment, the traffic platform 105 includes a data processing module 301, a map-matching module 303, an LDE detection module 305, an event categorization module 307, an LDW message module 309, an output module 311, and a machine learning system 123 has connectivity to the probe database 113 and the geographic database 115. The above presented modules and components of the traffic platform 105 can be implemented in hardware, firmware, software, or a combination thereof. Though depicted as a separate entity in FIG. 1, it is contemplated that the traffic platform 105 may be implemented as a module of any other component of the system 100. In another embodiment, the traffic platform 105, the machine learning system 123, and/or the modules 301-311 may be implemented as a cloud-based service, local service, native application, or combination thereof. The functions of the traffic platform 105, the machine learning system 123, and/or the modules 301-311 are discussed with respect to FIG. 4.

Figure 4:
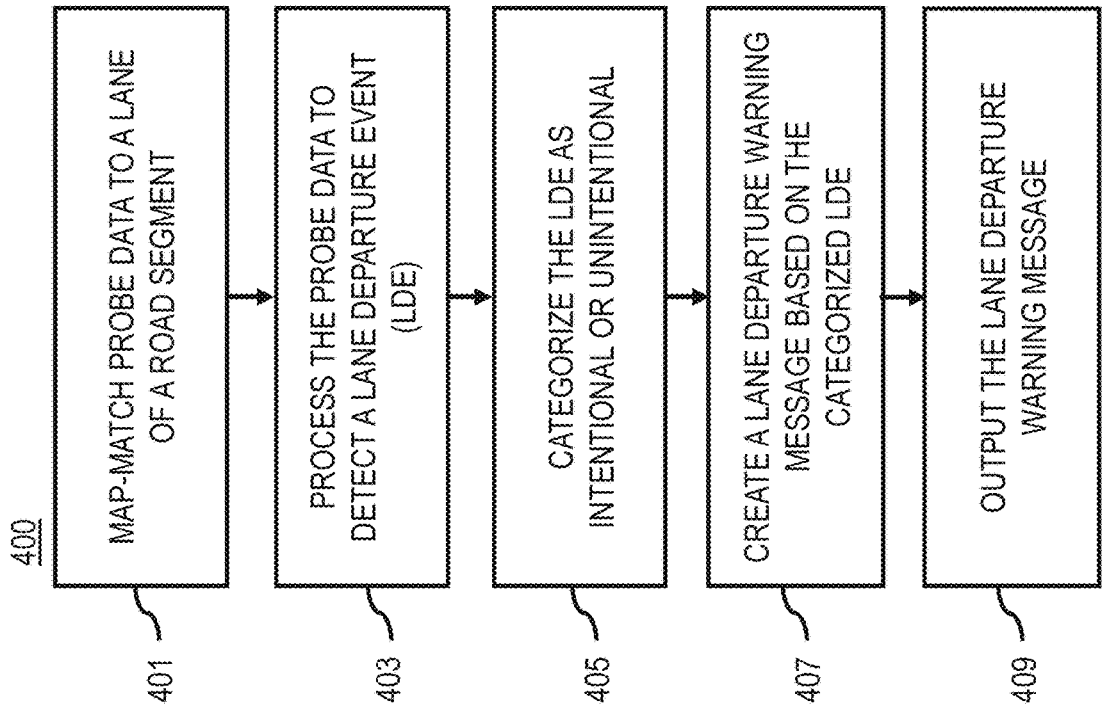
FIG. 4 is a flowchart of a process for detecting lane departure events based on map data and probe data, according to one embodiment.
Figure 10:
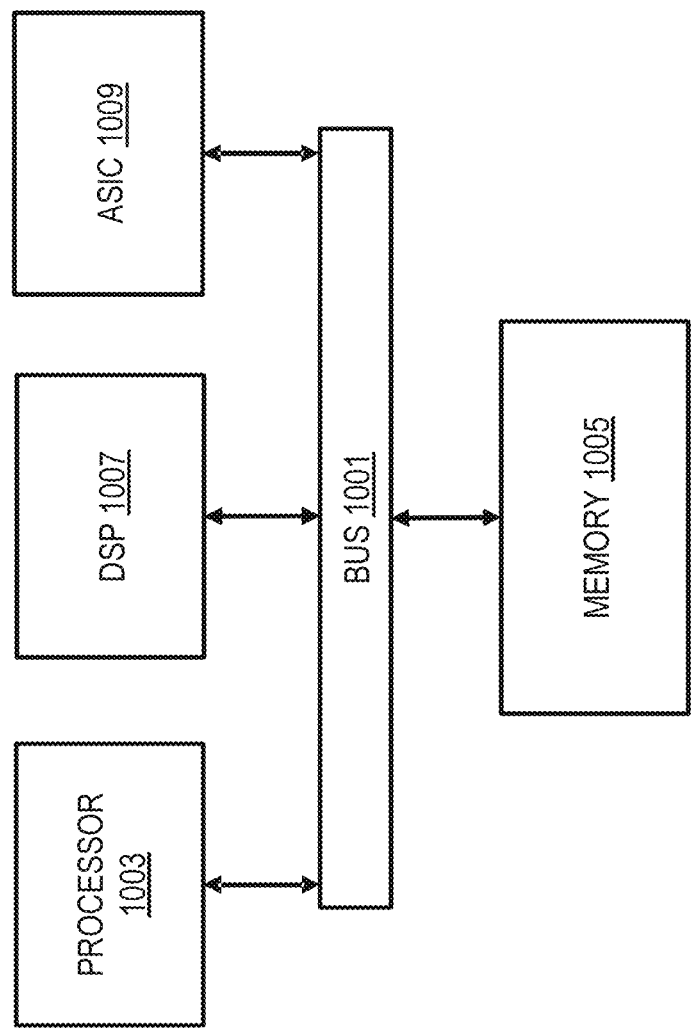
FIG. 10 is a diagram of a chip set that can be used to implement an embodiment.

FIG. 4 is a flowchart of a process for providing hybrid traffic incident identification, according to one embodiment. In various embodiments, the traffic platform 105, the machine learning system 123, and/or any of the modules 301-311 may perform one or more portions of the process 400 and may be implemented in, for instance, a chip set including a processor and a memory as shown in FIG. 10. As such, the traffic platform 105 and/or the modules 301-311 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, in step 401, the map-matching module 303 can map-match probe data to a lane of a road segment. In one embodiment, the probe data is directly collected from one or more sensors (e.g., location sensors) of the vehicle 101 and/or UE 109 that traversed the road segment of a multi-lane roadway within the road network. In another embodiment, the probe data is retrieved from one or more probe data providers (e.g., content providers 121a-121m). As mentioned, probe data may be reported as probe points, which are individual data records collected at a point in time that records telemetry data for that point in time.

By way of example, the trajectory may be map-matched to the respective map or geographic records (e.g., stored in the geographic database 115) via location data associations (such as using known or future map matching or geo-coding techniques) and more specifically, the trajectory may be map-matched to individual lanes (e.g., any of the travel lanes, shoulder lanes, restricted lanes, service lanes, etc.) of the roadways by matching the geographic coordinates (e.g., longitude and latitude) between the probe data and the respective lanes of the road segment.

More specifically, in one embodiment, the map-matching module 303 map-matches the probe data by processing the raw location data (e.g., probe data comprising GPS trace points or other location data) to identify which road, path, link, etc. and which lane of each road, path, link, etc. a probe device (e.g., a vehicle 101, a UE 109, etc.) is traveling. The map matching process, for example, enables the map-matching module 303 to correlate each drive of the vehicle 101a to a corresponding segment of the road network.

The map-matching module 303 can map-match real-time probe data of the vehicle 101a retrieved from a database (e.g., a local database of the vehicle 101a) with map data retrieved from a database (e.g., the geographic database 115) to see which lane the vehicle 101a is traveling and whether the vehicle 101a stays within the lane (e.g., Lane 2). In one embodiment, in step 403, based on the ma-matching results, the LDE detection module 305 can detect at least one lane departure event. By way of examples, the LDE detection module 305 detects a lane departure event of the vehicle 101a from Lane 2 to Lane 1 as shown in FIG. 2A, and a lane departure event of the vehicle 101a from Lane 2 to the shoulder as shown in FIG. 2B.

In another embodiment, the map-matching module 303 can apply the same map matching process using sensor data (e.g., GPS data) to a lane of a road segment, such that the data processing module 301 can validate the lane departure event detected using the probe data with lane departure event detected using the sensor data. The sensor data is collected from one or more sensors of at least one vehicle 101 (and/or other sensor data (e.g., from a UE 109) when traversing the road segment. In contrast to the probe data formatted as probe points, the sensor data is formatted as outputs from sensors of the vehicle 101 and/or the UE 109. By way of example, a speed sensor outputs a vehicle speed directly, while a vehicle speed value of a probe trajectory can be calculated by measuring a travel time between two probe data points of the probe trajectory.

In one embodiment, when the lane departure event detected using the probe data consists with lane departure event detected using the sensor data (e.g., their difference(s) being within one or more permissible thresholds of time change, speed change, steering angle change, lane change, etc.), the lane departure event can be forwarded to the event categorization module 307 for further processing. By way of example, the probe data shows that the vehicle 101a changed from Lane 2 to Lane 1 in 50 seconds, while the sensor data shows that the vehicle 101a changed from Lane 2 to Lane 1 in 40 seconds, such lane departure event can proceed to further processing. However, when the lane departure event detected using the probe data is inconsistent with lane departure event detected using the sensor data (e.g., their difference(s) being outside of the permissible thresholds), the lane departure event can be discarded. By way of example, the probe data shows that the vehicle 101a changed from Lane 2 to the shoulder in 30 seconds, while the sensor data shows that the vehicle 101a changed from Lane 2 to Lane 1 in 40 seconds, such lane departure event can discarded.

In one embodiment, in step 405, once a lane departure event is detected and/or validated, the event categorization module 307 can categorize the at least one lane departure event as an intentional lane departure event or an unintentional lane departure event. Referring back to FIG. 2A, an intentional lane departure event may be a lane-overtaking event, a ramp-exiting event, etc. Referring back to FIG. 2B, an unintentional lane departure event may be caused by one or more reasons like drowsy driving, lane geometry, path hole, animal on the road, weather, congestion, etc.

In one embodiment, the map-matching module 303 works in conjunction with the LDE detection module 305 to process the probe data to detect at least one lane departure event, using a LDE detection algorithm listed in Table 1. In this instance, the event categorization module 307 can determine a time change, a speed change, a steering angle change, a lane change, or a combination thereof of the at least one vehicle based on the probe data. The categorizing of the at least one lane departure event is based on the time change, the speed change, the steering angle change, the lane change, or a combination thereof. By way of example, the LDE detection algorithm can use parameters such as a vehicle initial speed at t1, a vehicle final speed at t2, an initial driving lane l1 at t1, a final driving lane l2 at t2, a steering angle deg1 at t1, a steering angle deg 2 at t2, etc. The Δt threshold, Δspeed threshold, Δsteering angle threshold, etc. listed in Table 1 may be defined based on safety risk consequences of the LDE.

In one instance, l1 and l2 can be different but adjacent lanes. In another instance, l1 and l2 can be close on the same road segment or a traffic message channel (TMC) link. In another instance, l2 can be a shoulder, pavement, etc. A TMC Points is a point/node pre-defined and coded in the road network, and a TMC link is a road segment between two consecutively defined TMC Points.

TABLE 1

Figure 5:
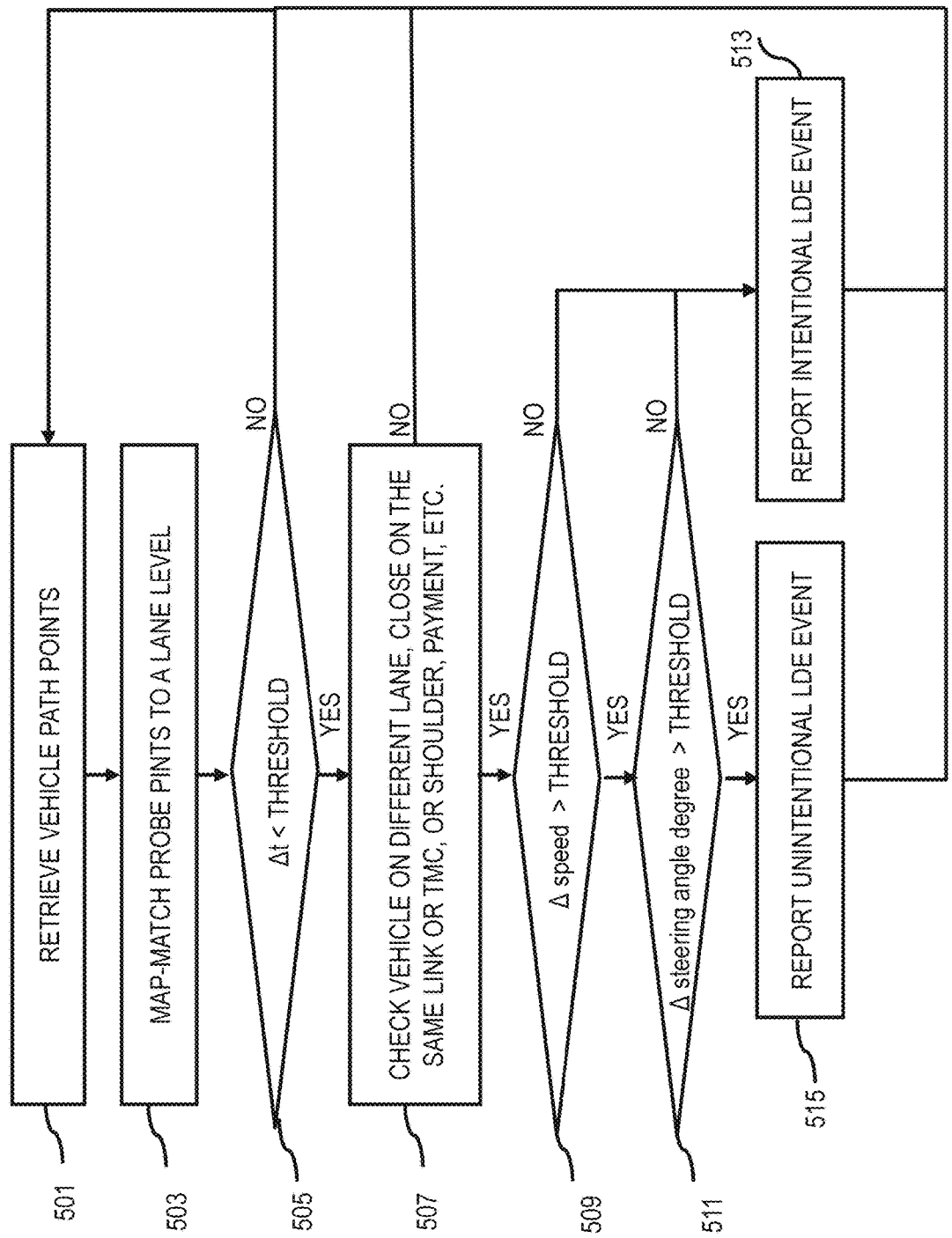
FIG. 5 is a flowchart of a process for detecting lane departure events using a LDE detection algorithm, according to one embodiment.

.
Algorithm LDE Detection
    Input: P, a sorted list of a vehicle's path probe points after map matching at a lane level and sorted by GPS timestamp.
    Output: LDE event and type.
    if P.size = 0 return null
    for any two adjacent two probe points in P,
        do if
            i < j for all p[i], p[j] ∈ P,
              a.  delta time (p[j].time − p[i].time) <predefined threshold Δt
              b.  l1 and l2 are different but adjacent lanes, or in close distances on the same link or TMC, or l2 is on shoulder, pavement,... etc.
              c.  if p[j].speed − p[i].speed >= Δspeed threshold & deg2 − deg1 > Δdegree threshold steering angle degree
                    return an unintentional LDE event composed of {p[i], p[j]} pair
              else
                    return an intentional LDE event composed of {p[i], p[j]} pair
return null FIG. 5 is a flowchart of a process 500 for detecting lane departure events using a LDE detection algorithm, according to one embodiment. In this instance, the map-matching module 303 can retrieve probe points of a vehicle's path in step 501, and map-matching the probe points at a lane level in step 503. The event categorization module 307 can then sort the probe points per GPS timestamp into Input: P. For any two adjacent probe points p[i], p[j] in Input P, the event categorization module 307 can determine in step 505 whether a delta time Δt (p[j].time−p[i].time) is shorter than a predefined Δt threshold (e.g., 20 seconds). If yes, the event categorization module 307 proceeds to step 507. If no, the event categorization module 307 determines that there is no LDE event occurring between the adjacent probe points p[i], p[j], and the process 500 returns to step 501.

In step 507, the event categorization module 307 can determine whether l1 and l2 are different but adjacent lanes, or close on the same road segment or a TMC link, or l2 is on a shoulder, pavement, . . . etc. If yes, the event categorization module 307 proceeds to step 509. If no, the event categorization module 307 determines that there is no LDE event occurring between the adjacent probe points p[i], p[j], and the process 500 returns to step 501.

In step 509, the event categorization module 307 can determine whether p[j].speed−p[i].speed is more than or equal to a speed change threshold Δspeed (e.g., +25 mph above speed limit). When switching lanes intentionally, most drivers wait until there is a clear gap in the traffic, then move safely and smoothly into the center of the desired lane, while maintaining the speed in the flow of traffic so that no other vehicle is forced to slow down, speed up, or change lanes to avoid collision. In some instances, the vehicle 101a can speed up a little to reduce the likelihood of being hit by a vehicle behind, but not so much as to be 25 mph above a speed limit. On the other hand, when switching lanes unintentionally, for example, some drivers gas up on a speed peddle by accident when drowsy as to speed up unreasonably. If so, the event categorization module 307 proceeds to step 511. Otherwise, the event categorization module 307 determines that there is an intentional LDE event (e.g., a regular lane-switching event) occurring between the adjacent probe points p[i], p[j] in step 513, and the process 500 returns to step 501.

In step 511, the event categorization module 307 can determine whether p[j] deg2−p[i] deg1 is more than a steering angle threshold Δdegree (e.g., 45 degrees). As most drivers switch lane safely and smoothly into the center of the desired lane, while maintaining the speed in the flow of traffic, rather than making at a sharp steering angle change that increase the likelihood of being hit by a vehicle behind. If so, the event categorization module 307 determines that there is an unintentional LDE event (e.g., to avoid a path hole or animal running on the road) occurring between the adjacent probe points p[i], p[j] in step 515, and the process 500 returns to step 501. Otherwise, the event categorization module 307 determines that there is an intentional LDE event (e.g., a regular lane-switching event) occurring between the adjacent probe points p[i], p[j] in step 513, and the process 500 also returns to step 501.

In step 407, the LDW message module 309 can create a lane departure warning (LDW) message for the road segment based on the at least one categorized lane departure event. By way of example, the LDW message module 309 creates a LDW message warning the driver of the vehicle 101a and/or the system 100 about a detected unintentional LDE, in order to mitigate the safety risk. As another Example, the LDW message module 309 creates a LDW message warning the driver of the vehicle 101a and/or the system 100 about an intentional LDE (e.g., a lane-overtaking event, a ramp-exiting event, etc.), in order to show and/or analyze the traffic flow, etc.

In another embodiment, the LDW message module 309 can record a timestamp, a map attribute, vehicle sensor data, or a combination thereof associated with the at least one lane departure event, thereby creating the lane departure warning message further based on the timestamp, the map attribute, the vehicle sensor data, or a combination thereof. By way of example, a LDW message about the detected intentional LDE of FIG. 2A may include 11:45 am Jun. 12, 2020, 38.892082, −77.019922, changing into an inner lane for a left turn, etc. As another example, a LDW message about the detected unintentional LDE of FIG. 2B may include 3:45 pm Jun. 17, 2020, 38.876381, −77.018066, driving onto a shoulder, etc.

In step 409, the output module 311 can provide the lane departure warning message as an output. In one embodiment, the output is provided to at least one other vehicle to determine an operation of the at least one other vehicle. In another embodiment, the output module 311 can store the lane departure warning message in a lane departure warning database.

Figure 6:
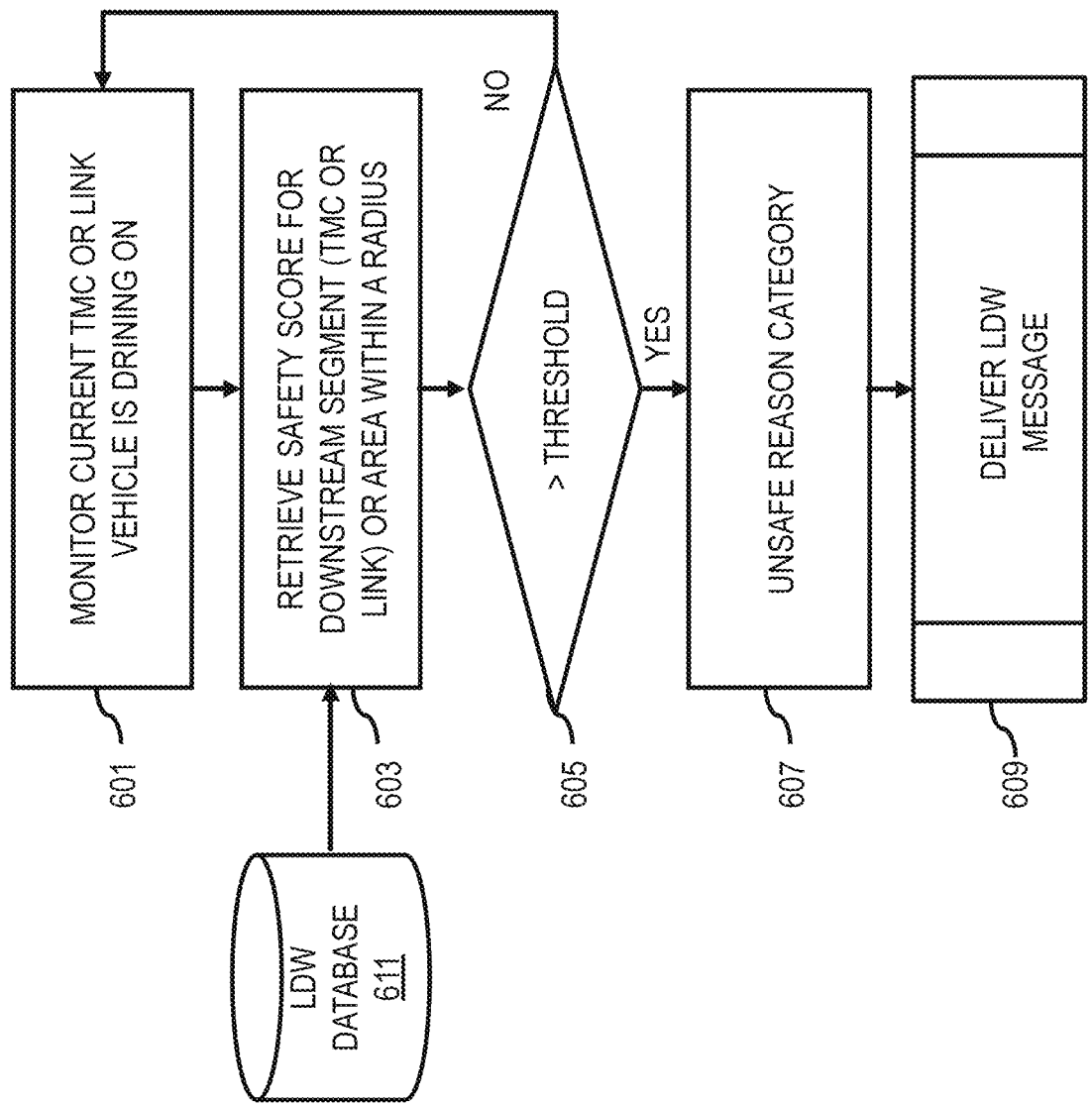
FIG. 6 is a flowchart of a process for proactive lane departure warnings (LEWs), according to one embodiment.

By way of example, FIG. 6 is a flowchart of a process 600 for proactive lane departure warnings (LDWs), according to one embodiment. In step 601, the LDW message module 309 can monitor road link the vehicle 101 is driving on, one or more current traffic message channels, vehicle-to-vehicle communication services, vehicle-to-everything (V2X) communication services, etc., to identify road segments with multiple lane departure warning messages within a time period, thereby calculate a safety/risk score per road segment. In another embodiment, the LDW message module 309 can retrieve a safety/risk score of traversing a downstream road link or TMC link or a road area within a radius of interest in step 603.

In one instance, the safety/risk score is retrieved from a government database. There are government agencies analyze the safety of a roadway and generate data-driven safety score (e.g., 1-5 scale) for road segments (e.g., coded in 100-meter segments). In another instance, such safety/risk score can be determined based on the lane departure warning message, lane departure warning messages in a road segment LDW database 611, or a combination thereof. For example, the LDW message module 309 can assign a safety/risk score or a danger level (e.g., from 1 to 5) to each detected lane departure event (e.g., based on the impact of the event on the driver/passengers, travel delays, other traffic disruptions, etc. on the road segment, the nearby road segments, the road network, etc.). It is contemplated that a safety/risk score can be expressed using, for instance, any number of categories or degrees of negative impact (e.g., low, medium, high, etc.).

In one instance, the road segment LDW database 611 can be queried for the lane departure warning message based on determining that at least one other vehicle is approaching the road segment within a threshold distance (e.g., 3 km). By way of example, a upstream vehicle 101b is approaching the road segment of the vehicle 101a, and queries for one or more lane departure warning messages associated with the road segment.

In one embodiment, the LDW message module 309 can run statistical data analysis and label the road segment, a geographic area associated with the road segment, a location on the road segment, or a combination thereof based on the lane departure warning message.

In step 605, referring back to the upstream vehicle query example, the LDW message module 309 can determine a count of the intentional lane departure event, the unintentional lane departure event, or a combination thereof occurring on the road segment during a time period based on the probe data, thereby creating a lane departure warning message for the upstream vehicle based on determining that the count is greater than a threshold value (e.g., 5 in one week). In one instance, a LDW message about intentional LDEs may include in the past hour of Jun. 12, 2020, 155 vehicles near 38.892082, −77.019922, changing into an inner lane for a left turn. As another example, a LDW message about unintentional LDEs may include in the past 30 minutes on Jun. 17, 2020 one vehicle near 38.876381, −77.018066 driving onto a shoulder and causing a congestion.

In one embodiment, the LDW message module 309 can use the senor data to determine causes of unintentional lane departure events, thereby determine a unsafe reason category in step 607. Common causes of unintentional lane departure events may include driving negligently or recklessly, not paying attention to the environment or other vehicles on the road, poor weather conditions (such as heavy rain, snow and ice, etc.), unsafe road conditions, excessive speeding (leading to an impaired reaction time), distracted driving (e.g., using a cellphone while driving, engaging in another distracting activity), excessive passing of other cars on the road, driving while under the influence of drugs and alcohol, etc. By way of example, the LDW message module 309 creates a LDW message for the driver of the vehicle 101a and/or the system 100 about a detected intentional LDE (e.g., a unintentional lane change to the shoulder in FIG. 2B, for example, as the driver dozes off). In addition, the LDW message can warn the driver to stop dozing. In step 609, the output module 311 can deliver the LDW message to the upstream vehicle.

In one embodiment, the output module 311 can store the labeled road segment, the labeled geographic area, the labeled location, the LDW message for the upstream vehicle, or a combination thereof in the road segment LDW database 611. The data stored in the road segment LDW database 611 can be used to train machine learning models as follows. The road segment LDW database 611 can stand alone, or be a part of the probe database 113, the geographic database 115, or a combination thereof.

In another embodiment, the LDW message module 309 in connection with the machine learning system 123 can use the senor data to determine respective probabilities of causes of unintentional lane departure events using machine learning. In one instance, the respective probabilities of causes can be defined as historic average counts of unintentional LDEs with respect to a road segment as a function of time, and high counts can be converted into higher probabilities. By way of example, the more counts of LDEs caused by a unsafe road condition (e.g., path holes, big road curves, etc.), the higher probability the LDE of interest is caused by the unsafe road condition. In another instance, the event categorization module 307 can factor a current traffic on the road segment. In other instances, driver preferences may be associated with the causes of unintentional LDEs, such as a travel speed, calendar data, etc. to tailor the probabilities to a driver.

In yet another embodiment, the LDW message module 309 in connection with the machine learning system 123 can select respective weights of the causes of unintentional LDEs. In one embodiment, the LDW message module 309 can train the machine learning system 123 to select or assign respective weights, correlations, relationships, etc. among the causes of unintentional LDEs, thereby determining the possible causes of unintentional LDEs and respective probabilities. In one instance, the LDW message module 309 can continuously provide and/or update a machine learning model (e.g., a neural network, support vector machine (SVM), decision tree, k-nearest neighbors matching, etc.) of the machine learning system 123 during training using, for instance, supervised deep convolution networks or equivalents. In other words, the LDW message module 309 trains the machine learning model using the respective weights of the causes of unintentional LDEs to most efficiently select the possible causes of unintentional LDEs and the respective probabilities, in order to generate a lane departure warning message with respect to the above-described embodiments.

In another embodiment, the data processing module 301 can determine a recommended route based on the intentional lane departure event, the unintentional lane departure event, the lane departure warning message, etc. using machine learning. In one instance, the machine learning system 123 can continuously provide and/or update a machine learning route model using, for instance, supervised deep convolution networks or equivalents. For instance, it is contemplated that the system 100 can automatically detect any lane departure events on the travel path of the vehicle 101 and recommend or reroute the vehicle 101 to ensure the safety of the vehicle 101, the passengers, and/or other persons or vehicles in the area. In another instance, the system 100 may take evasive actions with respect to any lane departure warnings without first delivering a lane departure warning message to the user.

In one embodiment, the output module 311 can deliver lane departure event messages via one or more data messages over the air radio interface, transport protocol experts group (TPEG) service by connected hypertext transfer protocol (HTTP) or user datagram protocol (UDP), and/or dedicated short range communications (DSRC) broadcasting data (e.g., via the communication network 107). In one instance, the system 100 can deliver lane departure warning messages to a vehicle 101, a user of the vehicle 101 (e.g., a driver or a passenger), or a combination thereof via a UE 109 (e.g., an embedded navigation system, a mobile device, or a combination thereof) and/or an application 111 running on the UE 109. In one example, a governmental agency (e.g., a police force) can use the lane departure event messages to better position service patrol resources (i.e., highway helper trucks). In another instance, a service provider (e.g., a service 119) can alert all mobile phone users with the lane departure event messages in a targeted area (e.g., through geofencing) using an emergency messaging system (e.g., the communication network 107). Consequently, the categorization of the various lane departure events by the system 100 and the provision of corresponding LDW messages to users can improve driver and vehicle awareness of the current state of the road network and the reasons for an update or the change in the status of the safety messages. In addition, in one embodiment, the lane departure event messages can be further used to improve autonomous driving safety.

In another embodiment, the system 100 can determine that a vehicle 101 is approaching a road segment within a threshold distance (e.g., 1 km), for example, upstream of the vehicle 101a that was involved in a reported lane departure event). The system 100 can then query for a lane departure warning (LDW) database (e.g., the LDW database 611) for a lane departure warning message associated with the road segment. The lane departure warning message can be created from at least one lane departure event detected from probe data map-matched at a lane-level to the road segment. The lane departure warning message is categorized as an intentional lane departure event (e.g., as shown in FIG. 2A) or an unintentional lane departure event (e.g., as shown in FIG. 2B). The system 100 can deliver the lane departure warning message to the vehicle 101.

Referring back to FIG. 6, the system 100 can determine a safety score for the road segment based on the lane departure warning message for the road segment, one or more other road segments within a proximity threshold of the road segment (e.g., 500 feet), or a combination thereof. The delivering of the lane departure warning message is based on the safety score. As mentioned, the safety score can be determined based on the lane departure warning message, e.g., based on the impact of the event on the driver/passengers, travel delays, other traffic disruptions, etc. on the road segment, the nearby road segments, the road network, etc. It is contemplated that a safety/risk score can be expressed using, for instance, any number of categories or degrees of negative impact (e.g., low, medium, high, etc.).

The lane departure warning message is created based on determining that a count of the intentional lane departure event, the unintentional lane departure event, or a combination thereof is greater than a threshold value. The road segment, a geographic area associated with the road segment, a location on the road segment, or a combination thereof is labeled based on the lane departure warning message. By way of example, the vehicle can be an autonomous vehicle, and the lane departure warning message (e.g., "Land change of a vehicle 100 feet ahead"), is used to mitigate a safety risk associated with operating the autonomous vehicle on the road segment.

Figure 7A:
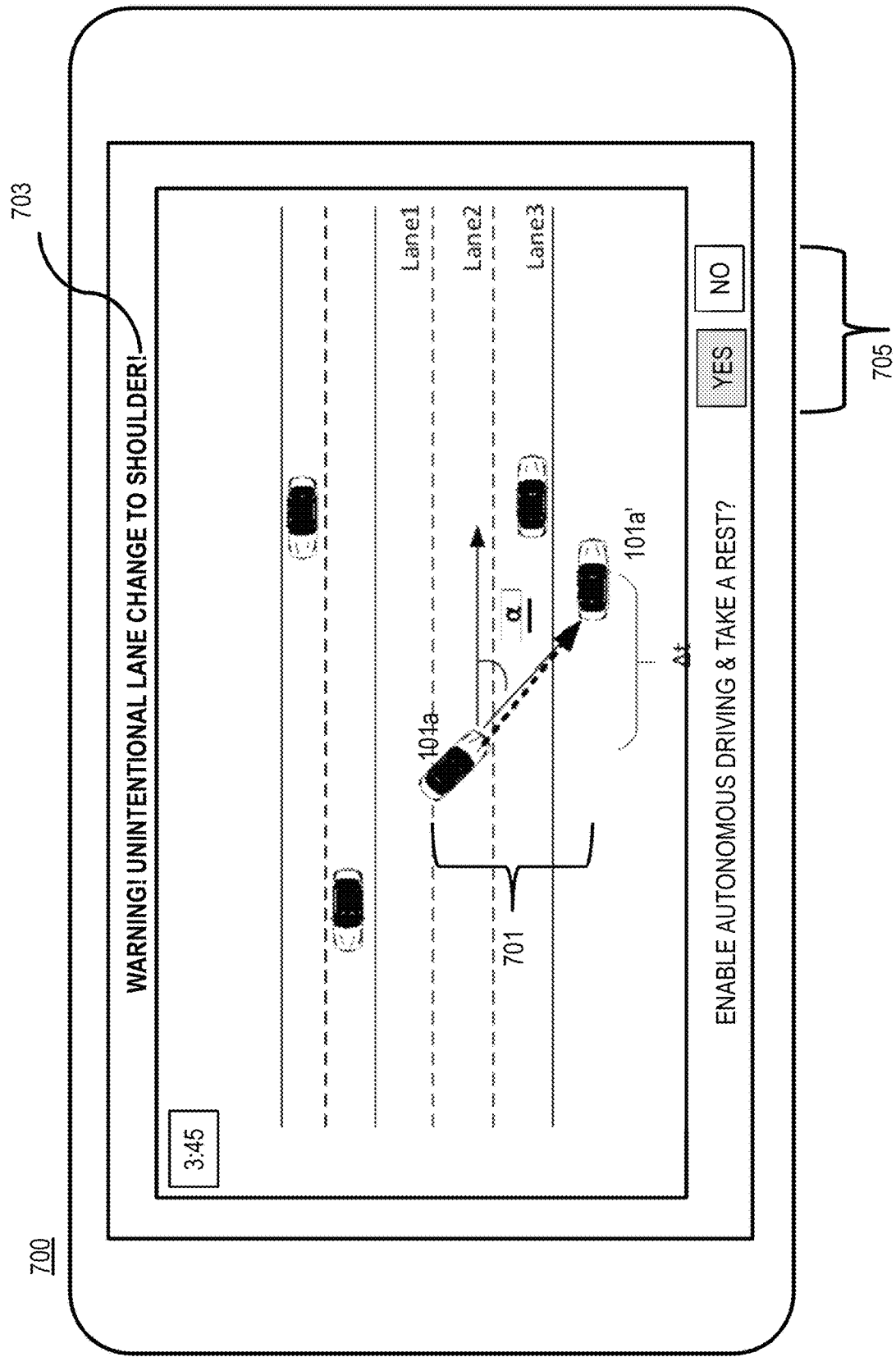
FIGS. 7A-7C are diagrams of example user interfaces for presenting lane departure events and lane departure warning messages, according to various embodiments.

A LDW alert/message can be displayed to a user or only issued (without displaying) to the vehicle 101a, other vehicles 101, etc. proactively as predicted a lane departure event (LDE) is going to happen, as the LDE is happening, and/or after the LDE has happened. FIG. 7A is a diagram of an example user interface 700 depicting a lane departure event 701 of the vehicle 101 and an alert "Warning! Unintentional Lane Change to Shoulder!" 703, according to one embodiment. By way of example, after the LDE has happened, the user interface 700 shows a current time 3:45, and a prompt 705 of "Enable Autonomous Driving & Take a Rest?"

Figure 7B:
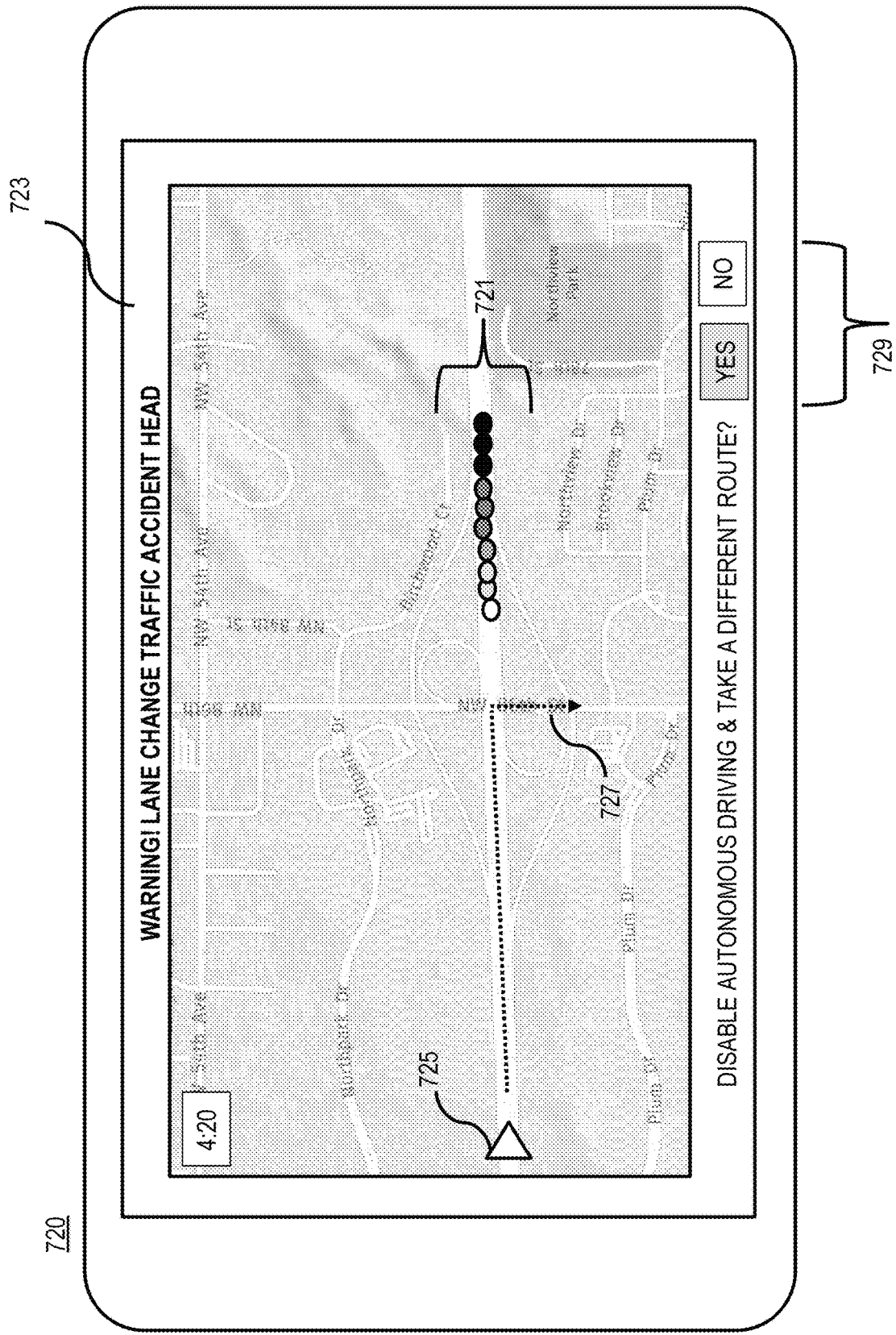

FIG. 7B is a diagram of an example user interface 720 depicting a traffic accident 721 caused by an LDE and an alert "Warning! Lane Change Traffic Accident Ahead" 723, and a current location 725 of an upstream vehicle 101, according to one embodiment. By way of example, the user interface 720 of the vehicle 101 shows a current time 4:00, an alternative route 727, and a prompt 729 of "Disable Autonomous Driving & Take a Different Route?"

Figure 7C:
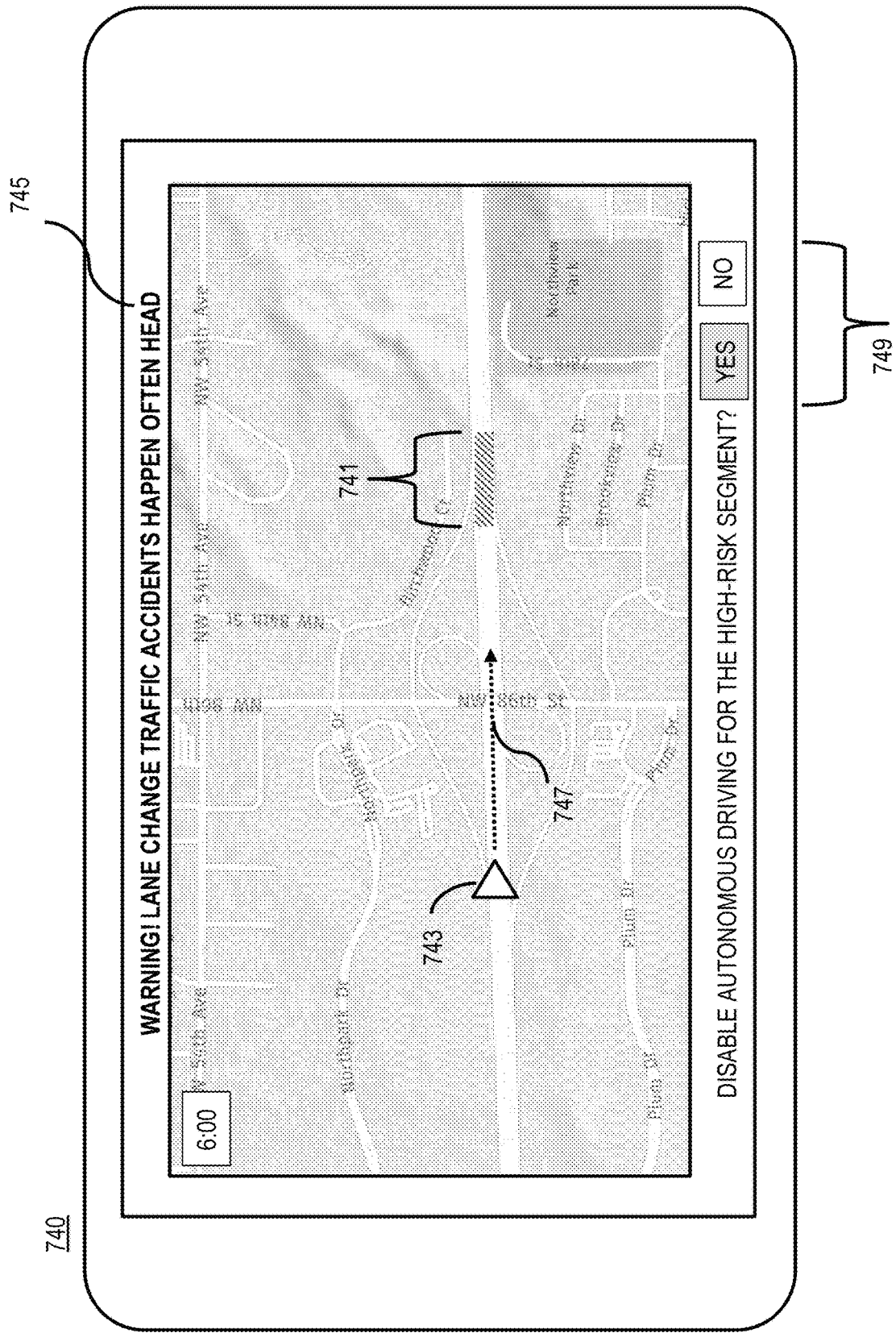

FIG. 7C is a diagram of an example user interface 740 depicting a high-probability unintentional LDE road segment 741 and an alert "Warning! Lane Change Traffic Accidents Happen Often Ahead" 743, and a current location 745 of an upstream vehicle 101, according to one embodiment. By way of example, the user interface 740 of the vehicle 101 shows a current time 6:00, a current route 747, and a prompt 749 of "Autonomous Driving for the High-risk Segment?"

The above-referenced embodiments detect lane departure events (LDEs) based on the probe data and map data, conduct historical statistical analysis on LDES to generate lane departure warning (LDW) database, thereby delivering proactive LDWs to alert vehicles driving upstreaming before reach the area where there were multiple lane departure events happened in certain period time, and mitigating the driving safety risks. The above-referenced embodiments further improve the safety of highly automated driving or autonomous driving, v2x and/or v2v data service based on the LDW messages.

Returning to FIG. 1, in one embodiment, the traffic platform 105 has connectivity over the communication network 107 to the services platform 117 (e.g., an OEM platform) that provides one or more services 119a-119n (also collectively referred to herein as services 119) (e.g., probe and/or sensor data collection services). By way of example, the services 119 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. lane-level lane departure event detection and messages) of the traffic platform 105 to provide services such as navigation, mapping, other location-based services, etc.

In one embodiment, the traffic platform 105 may be a platform with multiple interconnected components. The traffic platform 105 may include multiple servers, intelligent networking devices, computing devices, components, and corresponding software for providing parametric representations of lane lines. In addition, it is noted that the traffic platform 105 may be a separate entity of the system 100, a part of the services platform 117, a part of the one or more services 119, or included within the vehicles 101 (e.g., an embedded navigation system).

In one embodiment, content providers 121a-121m (also collectively referred to herein as content providers 121) may provide content or data (e.g., including probe data, sensor data, etc.) to the traffic platform 105, the UEs 109, the applications 111, the probe database 113, the geographic database 115, the services platform 117, the services 119, and the vehicles 101. The content provided may be any type of content, such as map content, textual content, audio content, video content, image content, etc. In one embodiment, the content providers 121 may provide content that may aid in localizing a vehicle path or trajectory on a lane of a digital map or link. In one embodiment, the content providers 121 may also store content associated with the traffic platform 105, the probe database 113, the geographic database 115, the services platform 117, the services 119, and/or the vehicles 101. In another embodiment, the content providers 121 may manage access to a central repository of data, and offer a consistent, standard interface to data, such as a repository of the geographic database 115.

By way of example, the UEs 109 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.). In one embodiment, a UE 109 may be associated with a vehicle 101 (e.g., a mobile device) or be a component part of the vehicle 101 (e.g., an embedded navigation system). In one embodiment, the UEs 109 may include the traffic platform 105 to detect lane departure events based on map data and probe data.

In one embodiment, as mentioned above, the vehicles 101, for instance, are part of a probe-based system for collecting probe data and/or sensor data for detecting traffic incidents (e.g., lane departure events) and/or measuring traffic conditions in a road network. In one embodiment, each vehicle 101 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors 103 for reporting measuring and/or reporting attributes. The attributes can also be any attribute normally collected by an on-board diagnostic (OBD) system of the vehicle 101, and available through an interface to the OBD system (e.g., OBD II interface or other similar interface).

The probe points can be reported from the vehicles 101 in real-time, in batches, continuously, or at any other frequency requested by the system 100 over, for instance, the communication network 107 for processing by the traffic platform 105. The probe points also can be map matched to specific road links stored in the geographic database 115. In one embodiment, the system 100 (e.g., via the traffic platform 105) can generate probe traces (e.g., vehicle paths or trajectories) from the probe points for an individual probe so that the probe traces represent a travel trajectory or vehicle path of the probe through the road network.

In one embodiment, as previously stated, the vehicles 101 are configured with various sensors (e.g., vehicle sensors 103) for generating or collecting probe data, sensor data, related geographic/map data, etc. In one embodiment, the sensed data represents sensor data associated with a geographic location or coordinates at which the sensor data was collected. In one embodiment, the probe data (e.g., stored in the probe database 113) includes location probes collected by one or more vehicle sensors 103. By way of example, the vehicle sensors 103 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of vehicle manned or unmanned (e.g., cars, trucks, buses, vans, motorcycles, scooters, drones, etc.) that travel through road segments of a road network.

Other examples of sensors 103 of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 101 along a path of travel (e.g., while on a hill or a cliff), moisture sensors, pressure sensors, etc. In a further example embodiment, sensors 103 about the perimeter of the vehicle 101 may detect the relative distance of the vehicle 101 from a physical divider, a lane line of a link or roadway (e.g., vehicle path 201), the presence of other vehicles, pedestrians, traffic lights, potholes and any other objects, or a combination thereof. In one scenario, the vehicle sensors 103 may detect weather data, traffic information, or a combination thereof. In one embodiment, the vehicles 101 may include GPS or other satellite-based receivers to obtain geographic coordinates from satellites 125 for determining current location and time. Further, the location can be determined by visual odometry, triangulation systems such as A-GPS, Cell of Origin, or other location extrapolation technologies.

In one embodiment, the UEs 109 may also be configured with various sensors (not shown for illustrative convenience) for acquiring and/or generating probe data and/or sensor data associated with a vehicle 101, a driver, other vehicles, conditions regarding the driving environment or roadway, etc. For example, such sensors may be used as GPS receivers for interacting with the one or more satellites 125 to determine and track the current speed, position, and location of a vehicle 101 traveling along a link or roadway. In addition, the sensors may gather tilt data (e.g., a degree of incline or decline of the vehicle during travel), motion data, light data, sound data, image data, weather data, temporal data and other data associated with the vehicles 101 and/or UEs 109. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via communication network 107 as probe data (e.g., GPS probe data) according to any known wireless communication protocols. For example, each UE 109, application 111, user, and/or vehicle 101 may be assigned a unique probe identifier (probe ID) for use in reporting or transmitting said probe data collected by the vehicles 101 and/or UEs 109. In one embodiment, each vehicle 101 and/or UE 109 is configured to report probe data as probe points, which are individual data records collected at a point in time that records telemetry data.

In one embodiment, the traffic platform 105 retrieves aggregated probe points gathered and/or generated by the vehicle sensors 103 and/or the UE 109 resulting from the travel of the UEs 109 and/or vehicles 101 on a road segment of a road network. In one instance, the probe database 113 stores a plurality of probe points and/or trajectories generated by different vehicle sensors 103, UEs 109, applications 111, vehicles 101, etc. over a period while traveling in a monitored area. A time sequence of probe points specifies a trajectory—i.e., a path traversed by a UE 109, application 111, vehicle 101, etc. over the period.

In one embodiment, the communication network 107 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, vehicle sensors 103, traffic platform 105, UEs 109, applications 111, services platform 117, services 119, content providers 121, and/or satellites 125 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
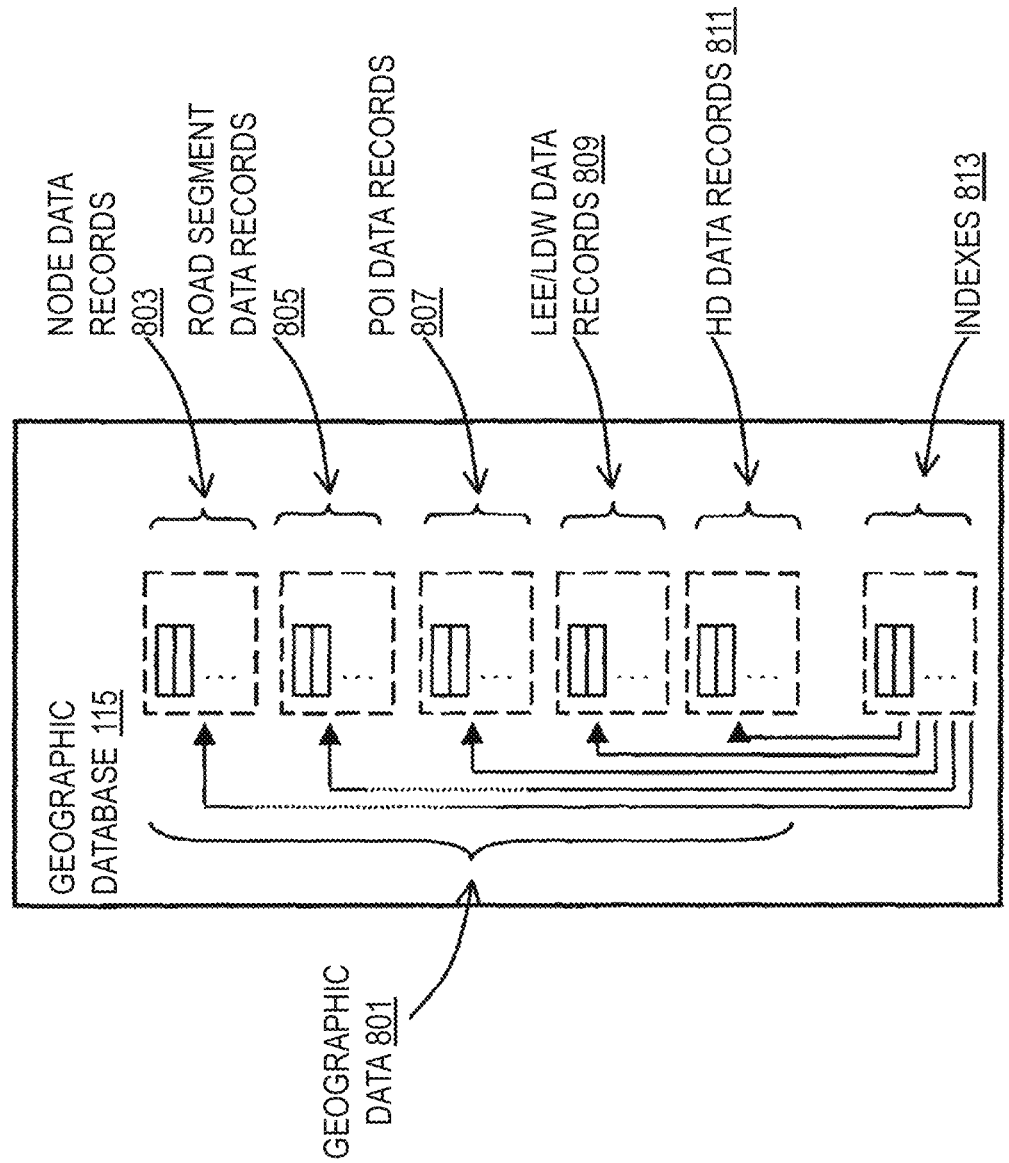
FIG. 8 is a diagram of a geographic database, according to one embodiment.

FIG. 8 is a diagram of a geographic database (such as the database 115), according to one embodiment. In one embodiment, the geographic database 115 includes geographic data 801 used for (or configured to be compiled to be used for) mapping and/or navigation-related services, such as for video odometry based on the parametric representation of lanes include, e.g., encoding and/or decoding parametric representations into lane lines. In one embodiment, the geographic database 115 include high resolution or high definition (HD) mapping data that provide centimeter-level or better accuracy of map features. For example, the geographic database 115 can be based on Light Detection and Ranging (LiDAR) or equivalent technology to collect billions of 3D points and model road surfaces and other map features down to the number lanes and their widths. In one embodiment, the HD mapping data (e.g., HD data records 811) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself "Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 803, road segment or link data records 805, POI data records 807, LDE/LDW data records 809, HD mapping data records 811, and indexes 813, for example. More, fewer, or different data records can be provided. In one embodiment, additional data records (not shown) can include cartographic ("carto") data records, routing data, and maneuver data. In one embodiment, the indexes 813 may improve the speed of data retrieval operations in the geographic database 115. In one embodiment, the indexes 813 may be used to quickly locate data without having to search every row in the geographic database 115 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 807. The geographic database 115 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 115 can also include LDE/LDW data records 809 for storing training data, prediction models, annotated observations, computed featured distributions, sampling probabilities, and/or any other data generated or used by the system 100 according to the various embodiments described herein. By way of example, the LDE/LDW data records 809 can be associated with one or more of the node records 803, road segment records 805, and/or POI data records 807 to support traffic reporting and/or autonomous driving based on the features stored therein and the corresponding estimated quality of the features. In this way, the records 809 can also be associated with or used to classify the characteristics or metadata of the corresponding records 803, 805, and/or 807.

In one embodiment, as discussed above, the HD mapping data records 811 model road surfaces and other map features to centimeter-level or better accuracy. The HD mapping data records 811 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 811 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 811 are created from high-resolution 3D mesh or point-cloud data generated, for instance, from LiDAR-equipped vehicles.

The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 121 in association with the services platform 117 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicles 101 and/or user terminals 109) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a user terminal 109, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting lane departure events based on map data and probe data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
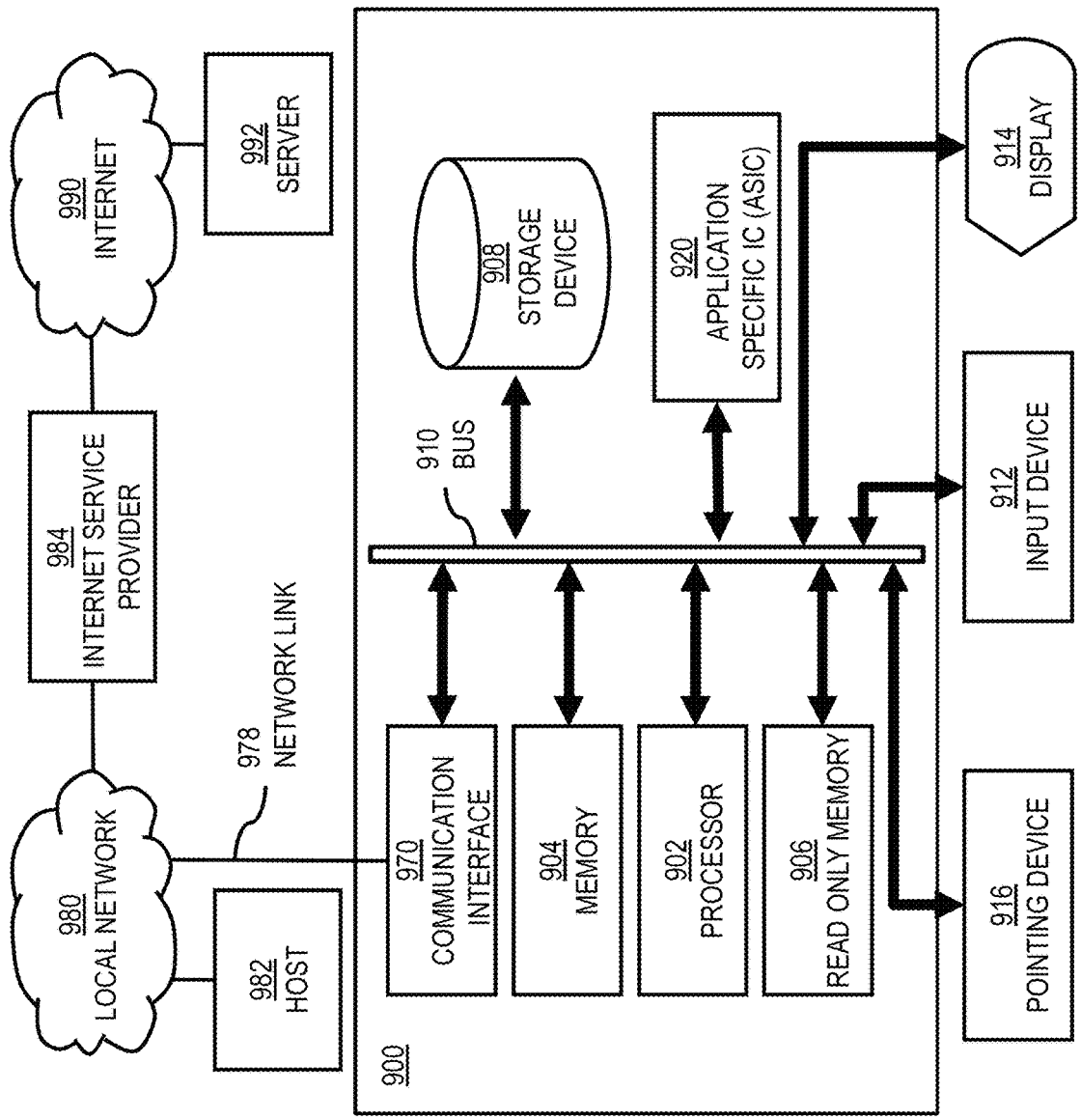
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to detect lane departure events based on map data and probe data as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to detecting lane departure events based on map data and probe data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for detecting lane departure events based on map data and probe data. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk, or flash card, for storing information, including instructions, that persists even when the computer system 900 is turned off or otherwise loses power.

Information, including instructions for detecting lane departure events based on map data and probe data, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners, and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic, or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for detecting lane departure events based on map data and probe data to the vehicle 101 and/or the UE 109.

The term computer-readable medium is used herein to refer to any medium that participates in providing information to processor 902, including instructions for execution. Such a medium may take many forms, including, but not limited to, non-volatile media, volatile media, and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to detect lane departure events based on map data and probe data as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to detect lane departure events based on map data and probe data. The memory 1005 also stores the data associated with or generated by the execution of the inventive steps.

Figure 11:
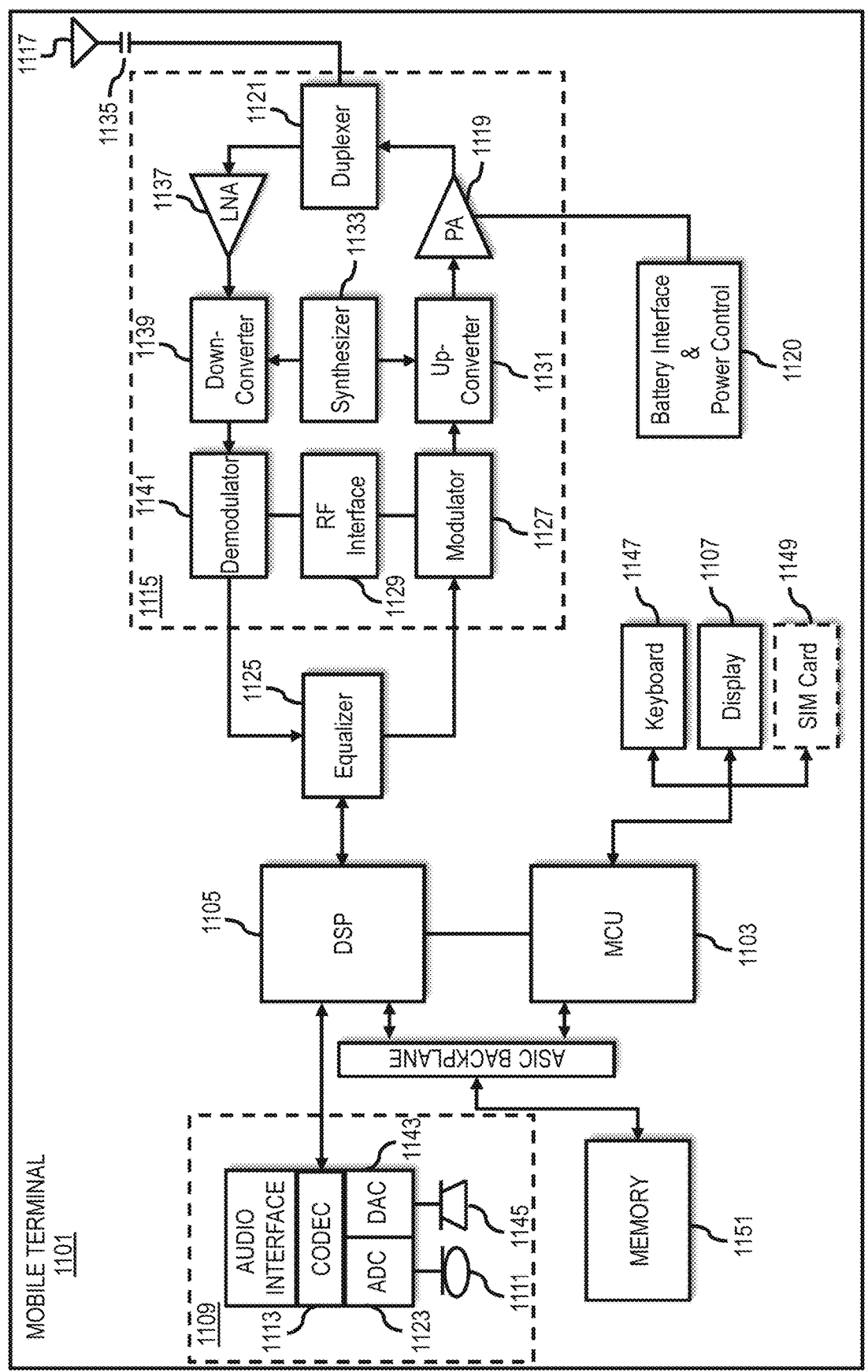
FIG. 11 is a diagram of a mobile terminal (e.g., handset or vehicle or part thereof) that can be used to implement an embodiment.

FIG. 11 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to detect lane departure events based on map data and probe data. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   map-matching probe data to a lane of a road segment, wherein the probe data is collected from one or more sensors of at least one vehicle that traversed the road segment, of one or more user devices within the at least one vehicle, or a combination thereof;
   processing the probe data to detect at least one lane departure event;
   categorizing the at least one lane departure event as an intentional lane departure event or an unintentional lane departure event caused by one or more driver errors, one or more driver distractions, driver drowsiness, or a combination thereof;
   determining one or more causes of the unintentional lane departure event using a machine learning model, wherein the one or more causes include the one or more driver errors, the one or more driver distractions, the driver drowsiness, or a combination thereof;
   creating a lane departure warning message for the road segment based on the at least one categorized lane departure event;
   storing the lane departure warning message in a lane departure warning database; and
   providing the lane departure warning message as an output.

2. The method of claim 1, further comprising:
   determining a count of the intentional lane departure event, the unintentional lane departure event, or a combination thereof occurring on the road segment based on the probe data,
   wherein the lane departure warning message is created based on determining that the count is greater than a threshold value.

3. The method of claim 1, further comprising:
   labeling the road segment, a geographic area associated with the road segment, a location on the road segment, or a combination thereof based on the lane departure warning message,
   wherein the output includes the labeled road segment, the labeled geographic area, the labeled location, or a combination thereof.

4. The method of claim 1, wherein the output is provided to at least one other vehicle to determine an operation of the at least one other vehicle.

5. The method of claim 1, further comprising:
   determining a time change, a speed change, a steering angle change, a lane change, or a combination thereof of the at least one vehicle based on the probe data,
   wherein the categorizing of the at least one lane departure event is based on the time change, the speed change, the steering angle change, the lane change, or a combination thereof.

6. The method of claim 1, further comprising:
   training the machine learning model by labelling contextual features associated with historic counts of unintentional lane departure events, road conditions, weather conditions, driving preferences, road link features, or a combination thereof, inputting the labelled contextual features to the machine learning model, and updating one or more weights associated with the one or more contextual features until reaching an accuracy level,
   wherein the lane departure warning database is queried for the lane departure warning message based on determining that at least one other vehicle is approaching the road segment within a threshold distance.

7. The method of claim 1, wherein a safety risk of traversing the road segment is determined based on the lane departure warning message.

8. The method of claim 1, further comprising:
   recording a timestamp, a map attribute, vehicle sensor data, or a combination thereof associated with the at least one lane departure event,
   wherein the lane departure warning message is created further based on the timestamp, the map attribute, the vehicle sensor data, or a combination thereof.

9. The method of claim 1, wherein the probe data includes real-time probe data.

10. An apparatus comprising:
    at least one processor; and
    at least one memory including computer program code for one or more programs,
    the at least one memory and the computer program code configured to, with the at least one processor, cause the apparatus to perform at least the following,
    determine that a vehicle is approaching a road segment within a threshold distance;
    query for a lane departure warning database for a lane departure warning message associated with the road segment, wherein the lane departure warning message is created from at least one lane departure event detected from probe data map-matched at a lane-level to the road segment, and wherein the lane departure warning message is categorized as an intentional lane departure event or an unintentional lane departure event caused by one or more driver errors, one or more driver distractions, driver drowsiness, or a combination thereof; and deliver the lane departure warning message to the vehicle.

11. The apparatus of claim 10, further comprising:
determine a safety score for the road segment based on the lane departure warning message for the road segment, one or more other road segments within a proximity threshold of the road segment, or a combination thereof,
wherein the delivering of the lane departure warning message is based on the safety score.

12. The apparatus of claim 10, wherein the lane departure warning message is created based on determining that a count of the intentional lane departure event, the unintentional lane departure event, or a combination thereof is greater than a threshold value.

13. The apparatus of claim 10, wherein the road segment, a geographic area associated with the road segment, a location on the road segment, or a combination thereof is labeled based on the lane departure warning message.

14. The apparatus of claim 10, wherein the vehicle is an autonomous vehicle, and wherein the lane departure warning message is used to mitigate a safety risk associated with operating the autonomous vehicle on the road segment.

15. A non-transitory computer-readable storage medium, carrying one or more sequences of one or more instructions which, when executed by one or more processors, cause an apparatus to at least perform the following steps:
map-matching probe data to a lane of a road segment, wherein the probe data is collected from one or more sensors of at least one vehicle that traversed the road segment, of one or more devices within the at least one vehicle, or a combination thereof;
processing the probe data to detect at least one lane departure event;
categorizing the at least one lane departure event as an intentional lane departure event or an unintentional lane departure event caused by one or more driver errors, one or more driver distractions, driver drowsiness, or a combination thereof;
determining one or more causes of the unintentional lane departure event using a machine learning model, wherein the one or more causes include the one or more driver errors, the one or more driver distractions, the driver drowsiness, or a combination thereof;
creating a lane departure warning message for the road segment based on the at least one categorized lane departure event;
storing the lane departure warning message in a lane departure warning database; and
providing the lane departure warning message as an output.

16. The non-transitory computer-readable storage medium of claim 15, wherein the apparatus is caused to further perform:
determining a count of the intentional lane departure event, the unintentional lane departure event, or a combination thereof occurring on the road segment based on the probe data,
wherein the lane departure warning message is created based on determining that the count is greater than a threshold value.

17. The non-transitory computer-readable storage medium of claim 15, wherein the apparatus is caused to further perform:
labeling the road segment, a geographic area associated with the road segment, a location on the road segment, or a combination thereof based on the lane departure warning message,
wherein the output includes the labeled road segment, the labeled geographic area, the labeled location, or a combination thereof.

18. The non-transitory computer-readable storage medium of claim 15, wherein the output is provided to at least one other vehicle to determine an operation of the at least one other vehicle.

19. The non-transitory computer-readable storage medium of claim 15, wherein the apparatus is caused to further perform:
determining a time change, a speed change, a steering angle change, a lane change, or a combination thereof of the at least one vehicle based on the probe data,
wherein the categorizing of the at least one lane departure event is based on the time change, the speed change, the steering angle change, the lane change, or a combination thereof.

* * * * *